(12) United States Patent
Tauchi et al.

(10) Patent No.: US 7,576,142 B2
(45) Date of Patent: Aug. 18, 2009

(54) POLYORGANOSILOXANE AND CURABLE COMPOSITION CONTAINING SAME

(75) Inventors: Kunikazu Tauchi, Nagoya (JP); Hiroshi Suzuki, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 38 days.

(21) Appl. No.: 11/572,502

(22) PCT Filed: Aug. 2, 2005

(86) PCT No.: PCT/JP2005/014124

§ 371 (c)(1),
(2), (4) Date: Jan. 23, 2007

(87) PCT Pub. No.: WO2006/013863

PCT Pub. Date: Feb. 9, 2006

(65) Prior Publication Data

US 2008/0033137 A1    Feb. 7, 2008

(30) Foreign Application Priority Data

Aug. 4, 2004   (JP) .............................. 2004-228690

(51) Int. Cl.
*C08G 65/18* (2006.01)

(52) U.S. Cl. ........................ 522/168; 522/148; 549/214; 528/29

(58) Field of Classification Search ................. 528/529, 528/29; 522/148, 168; 549/214
See application file for complete search history.

(56) References Cited

U.S. PATENT DOCUMENTS

| | | | |
|---|---|---|---|
| 3,338,867 A | | 8/1967 | Plueddemann et al. |
| 6,121,342 A | * | 9/2000 | Suzuki et al. ............... 522/148 |
| 2002/0106520 A1 | * | 8/2002 | Takahashi et al. ........... 428/447 |

FOREIGN PATENT DOCUMENTS

| | | |
|---|---|---|
| JP | 02-289611 | 11/1990 |
| JP | 05-287172 | 11/1993 |
| JP | 6-16804 | 1/1994 |
| JP | 7-300528 | 11/1995 |
| JP | 10-330485 | 12/1998 |
| JP | 11-29640 | 2/1999 |
| JP | 11-116682 | 4/1999 |
| JP | 11-199673 | 7/1999 |

OTHER PUBLICATIONS

Fogiel, M., Organic Chemistry I (Super Review, All you need to know), 2000, Research and Education Association, p. 265. □□(Polyol).*

* cited by examiner

*Primary Examiner*—Randy Gulakowski
*Assistant Examiner*—Olatunde S Ojurongbe
(74) *Attorney, Agent, or Firm*—Oblon, Spivak, McClelland, Maier & Neustadt, P.C.

(57) ABSTRACT

The object of the present invention is to provide a polyorganosiloxane that has a specific structure and is superior to curability and a curable composition which is high in workability during curing, which leads to a cured product excellent in ultraviolet-ray transparency and heat resistance, and further wherein toughness thereof and occurrence of a crack by cyclic heat-cool are improved. The present polyorganosiloxane is one obtained by conducting hydrolysis and condensation of a silicon-containing organic compound represented by the general formula (1) below in the presence of an organic polyol compound having two or more hydroxyl groups and has an oxetanyl group.

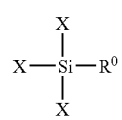

(1)

18 Claims, 1 Drawing Sheet

POLYORGANOSILOXANE AND CURABLE COMPOSITION CONTAINING SAME

TECHNICAL FIELD

The present invention relates to a polyorganosiloxane and a curable composition containing the same. More specifically, it relates to a polyorganosiloxane having an oxetanyl group, modified by an organic polyol compound and to the applications.

BACKGROUND ART

Recently, in the field of a light emitting diode (LED:Light Emitting Diode), an element used with an ultraviolet emitting diode comprising an InGaN-based material and the like are developed, and shortening of wavelength is proceeded. When a LED is used as a luminous element, the LED is usually sealed with a transparent resin.

A resin used for sealing a LED is an epoxy resin composition comprising a curative agent of an acid anhydride is general. However, when a LED was sealed with this epoxy resin composition, a crack is occurred on resin cured product by cyclic heat-cool, there have been problems in the case of using in a severe condition.

As other materials for sealing, a composition comprising acrylic resin having an alicyclic epoxy group, a cationic polymerization initiator and the like is used (cf. JP-A H02-289611). This composition leads to little deterioration by a light in sealing a LED and the like since the resin cured product does not have an aromatic ring, however, the cured product is brittler than a cured product with an acid anhydride and a crack destruction is easy to occur by cyclic heat-cool.

Therefore, it was problematic to utilize in applications using a LED that a long-time dependability was required, and the like.

In addition, a method for using a silicon-modified epoxy resin which was obtained by reacting an epoxy resin and an organopolysiloxane having a phenolic hydroxyl group to seal a LED and the like is disclosed (cf. JP-A H05-287172). According to this method, although toughness becomes higher due to being modified with silicon and a crack destruction is difficult to occur by cyclic heat-cool, ultraviolet-ray transparency is low and a resin is easy to deteriorate by an ultraviolet ray because resin has an aromatic ring.

DISCLOSURE OF THE INVENTION

Problems to be Solved by the Invention

The object of the present invention is to provide a polyorganosiloxane that has a specific structure and is superior to curability and a curable composition which is high in workability during curing, which leads to a cured product excellent in ultraviolet-ray transparency and heat resistance, and further wherein toughness of the cured product and occurrence of a crack by cyclic heat-cool are improved.

Means for Solving Problems

The present invention is shown below.

1. A polyorganosiloxane having an oxetanyl group, which is obtained by conducting hydrolysis and condensation of a silicon-containing organic compound represented by the general formula (1) below in the presence of an organic polyol compound having two or more hydroxyl groups.

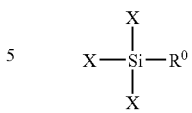

(1)

(In the formula, X is a hydrolysable group, and $R^0$ is an organic functional group having an oxetanyl group. Each of Xs may be same or different.)

2. The polyorganosiloxane according to 1 above, wherein $R^0$ in the general formula (1) is an organic functional group represented by the general formula (2) below.

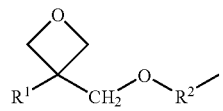

(2)

(In the formula, $R^1$ is a hydrogen atom or an alkyl group whose number of carbon atom is 1-6, and $R^2$ is an alkylene group whose number of carbon atom is 2-6.)

3. The polyorganosiloxane according to 1 above, which is obtained by conducting hydrolysis and condensation of a silicon-containing organic compound represented by the general formula (1) below in the presence of the aforementioned organic polyol compound and one compound selected from the group consisting of a silicon-containing organic compound represented by the general formula (3), a silicon-containing organic compound represented by the general formula (4) and a silicon-containing organic compound represented by the general formula (5).

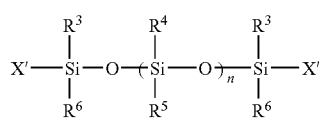

(3)

(In the formula, X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$ and $R^5$ is a substituent selected from the group consisting of an alkyl group, a cycloalkyl group and an aryl group, and n is an integer of 1-10,000.)

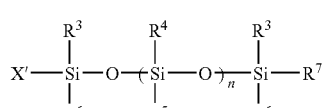

(4)

(In the formula, X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$, $R^5$ and $R^7$ is a substituent selected from the group consisting of an alkyl group, a cycloalkyl group and an aryl group, and n is an integer of 1-10,000.)

$$R^8{}_m SiX''{}_{4-m} \tag{5}$$

(In the formula, X" is a siloxane bond-formable group, $R^8$ is a substituent selected from the group consisting of an alkyl group, a cycloalkyl group and an aryl group, and m is an integer of 0-3.)

4. The polyorganosiloxane according to 2 above, which is obtained by conducting hydrolysis and condensation of a silicon-containing organic compound represented by the general formula (1) below in the presence of the aforementioned organic polyol compound and one compound selected from the group consisting of a silicon-containing organic compound represented by the general formula (3), a silicon-containing organic compound represented by the general formula (4) and a silicon-containing organic compound represented by the general formula (5).

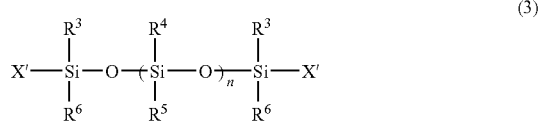

(3)

(In the formula, X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$ and $R^5$ is a substituent selected from the group consisting of an alkyl group, a cycloalkyl group and an aryl group, and n is an integer of 1-10,000.)

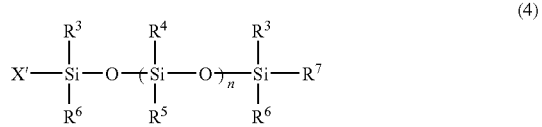

(4)

(In the formula, X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$, $R^5$ and $R^7$ is a substituent selected from the group consisting of an alkyl group, a cycloalkyl group and an aryl group, and n is an integer of 1-10,000.)

$$R^8{}_m SiX''{}_{4-m} \tag{5}$$

(In the formula, X" is a siloxane bond-formable group, $R^8$ is a substituent selected from the group consisting of an alkyl group, a cycloalkyl group and an aryl group, and m is an integer of 0-3.)

5. A curable composition, characterized in comprising the aforementioned polyorganosiloxane according to 1 above, a cationic polymerizable monomer and a cationic polymerization initiator.

6. The curable composition according to 5 above, the aforementioned cationic polymerization initiator is one type selected from the group consisting of an onium salt and an organometallic complex.

Effects of the Invention

Since the polyorganosiloxane of the present invention is obtained by conducting hydrolysis and condensation of a silicon-containing organic compound having an oxetanyl group in the presence of an organic polyol compound having two or more hydroxyl groups, it is excellent in curability.

Since the curable composition of the present invention comprises the aforementioned polyorganosiloxane, a cationic polymerizable monomer and a cationic polymerization initiator, a cured product which is excellent in ultraviolet-ray transparency and heat resistance, further wherein toughness and occurrence of a crack by cyclic heat-cool are improved can be obtained. Therefore, it is useful as a sealing material for LED and the like, and industrial effect is significant.

BEST MODE FOR CARRYING OUT THE INVENTION

Figure 1:
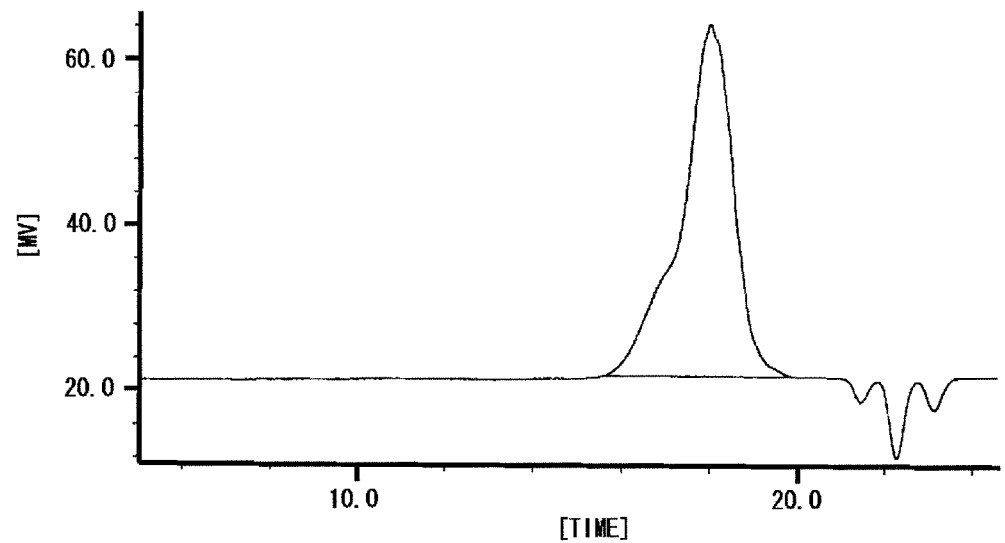
FIG. 1 is a GPC chromatogram of resin A1 obtained in Example 1-1.

Hereinafter, the present invention is explained in detail.

[1] Polyorganosiloxane Having Oxetanyl Group

The polyorganosiloxane having an oxetanyl group of the present invention (hereinafter, referred to "polyorganosiloxane".) is a hydrolysis-condensate obtained by hydrolysis and condensation of a silicon-containing organic compound having an oxetanyl group and a specific structure (cf. general formula (1), hereinafter, referred to "silicon-containing organic compound (I)".) in the presence of an organic polyol compound having two or more hydroxyl groups. In addition, the polyorganosiloxane having an oxetanyl group of the present invention is a hydrolysis-condensate obtained by hydrolysis and condensation using silicon-containing organic compounds consisting of the silicon-containing organic compound (I) and other silicon-containing organic compound (II) described below as co-hydrolysis and condensation, in the presence of an organic polyol compound having two or more hydroxyl groups.

[1-1] Silicon-Containing Organic Compound (I)

This silicon-containing organic compound (I) is a compound which is subjected to hydrolysis and condensation in the presence of an organic polyol compound having two or more hydroxyl groups and is indicated by the following general formula (1).

(1)

(In the formula, X is a hydrolysable group, and $R^0$ is an organic functional group having an oxetanyl group. Each of Xs may be same or different.)

The hydrolysable group X in the aforementioned general formula (1) is not particularly limited so long as it has hydrolysability, and examples thereof includes alkoxy group, cycloalkoxy group, aryloxy group, halogen atom and the like.

Among these, alkoxy group such as methoxy group, ethoxy group, n- and i-propoxy group, and n-, i- and t-butoxy group, cycloalkoxy group such as cyclohexyloxy group, and aryloxy group such as phenyloxy group.

In addition, because of high hydrolyzability, alkoxy group is more preferable, and alkoxy group whose number of carbon atom is 1-3 is further preferred. Particularly ethoxy group is easy to control hydrolysis reaction, being preferred.

Each of the aforementioned hydrolyzable group Xs in the aforementioned compound represented by the general formula (1) may be same or different.

$R^0$ in the aforementioned general formula (1) is an organic functional group having an oxetanyl group, and is preferably an organic functional group whose number of carbon atom is 20 or less. The particularly preferred $R^0$ is an organic functional group represented by the following formula (2).

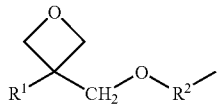

(2)

(In the formula, $R^1$ is a hydrogen atom or an alkyl group whose number of carbon atom is 1-6, and $R^2$ is an alkylene group whose number of carbon atom is 2-6.)

In the aforementioned general formula (2), $R^1$ is a hydrogen atom or an alkyl group whose number of carbon atom is 1-6, and preferably 1-3. Among these, ethyl group is preferred. In addition, $R^2$ is an alkylene group whose number of carbon atom is 2-6, and preferably 2-4. Among these, propylene group is preferred. This is because procurement and synthesis of an oxetane compound capable of forming such an organic functional group are easy. If a silicon-containing organic compound (I) having an oxetanyl group whose number of carbon atom of $R^1$ or $R^2$ is 7 or more in the aforementioned general formula (2) is used, a cured product using the curable composition is reduced in surface hardness.

It is noted that $R^0$ may be an organic functional group having an oxetanyl group and other functional group.

[1-2] Silicon-Containing Organic Compound (II)

This silicon-containing organic compound (II) is an effective component in promoting a hydrolysis and co-condensation reaction between the aforementioned silicon-containing organic compound (I) and an organic polyol compound. And it is also an effective component for adjusting curability of a polyorganosiloxane to be formed.

The aforementioned silicon-containing organic compound (II) is not particularly limited, but is preferably a silicon-containing organic compound having no oxetanyl groups and having a siloxane bond-formable group. Examples of that include compounds represented by the following general formulas (3)-(5) and the like.

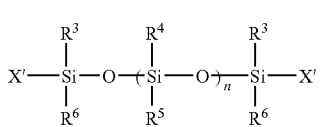

(3)

(In the formula, X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$ and $R^5$ is a substituent selected from the group consisting of an alkyl group, a cycloalkyl group and an aryl group, and n is an integer of 1-10,000.)

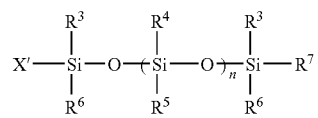

(4)

(In the formula, X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$, $R^5$ and $R^7$ is a substituent selected from the group consisting of an alkyl group, a cycloalkyl group and an aryl group, and n is an integer of 1-10,000.)

$$R^8{}_m SiX''_{4-m}$$ (5)

(In the formula, X" is a siloxane bond-formable group, $R^8$ is a substituent selected from the group consisting of an alkyl group, a cycloalkyl group and an aryl group, and m is an integer of 0-3.)

In the aforementioned formulas (3)-(5), siloxane bond-formable groups X' and X" are ones capable of forming a siloxane bond through a silicon atom of the aforementioned compound represented by the general formula (1) by hydrolysis. For example, a hydroxyl group, an alkoxy group, a cycloalkoxy group, an aryloxy group, a halogen atom and the like are given. Among these, a hydroxyl group, an alkoxy group, a cycloalkoxy group and an aryloxy group are preferred.

In the aforementioned general formulas (3) and (4), $R^3$ and $R^6$ are respectively selected from the group consisting of an alkoxy group whose number of carbon atom is preferably 1-6 (more preferably 1-4), a cycloalkoxy group whose number of carbon atom is preferably 5-8 (more preferably 5-6), an aryloxy group whose number of carbon atom is preferably 6-8 (more preferably 6-7), an alkyl group whose number of carbon atom is preferably 1-4 (more preferably 1-2), a cycloalkyl group whose number of carbon atom is preferably 5-8 (more preferably 5-6) and an aryl group whose number of carbon atom is preferably 6-8 (more preferably 6-7).

In addition, $R^4$, $R^5$ and $R^7$ are respectively selected from the group consisting of an alkyl group whose number of carbon atom is preferably 1-6 (more preferably 1-4), a cycloalkyl group whose number of carbon atom is preferably 5-8 (more preferably 5-6) and an aryl group whose number of carbon atom is preferably 6-8 (more preferably 6-7).

In the case both $R^4$ and $R^5$ are alkyl groups, the alkyl group may have the following polysiloxane bond on a carbon atom that is not bonded to Si.

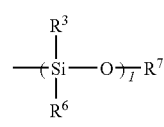

(In the formula, 1 is an integer of 1-1,000.)

Each of the aforementioned compounds represented by the general formulas (3) and (4) is a reactive silicone, and may be a compound having the siloxane bond-formable group X' alone or at two or more kinds in one molecule. In addition, this reactive silicone is preferably a straight-type silicone or a linear-type silicone having a branch. In that case, the aforementioned siloxane bond-formable group may be located at a side chain, and it may be located at the terminal.

The aforementioned siloxane bond-formable group X's in the compound represented by the general formula (3) may be same or different.

In the aforementioned general formula (5), $R^8$ is selected from the group consisting of an alkyl group whose number of carbon atom is preferably 1-6 (more preferably 1-4), a cycloalkyl group whose number of carbon atom is preferably 5-8 (more preferably 5-6) and an aryl group whose number of carbon atom is preferably 6-8 (more preferably 6-7). The alkyl group is preferably methyl group, ethyl group, n- and i-propyl group, n-, i- and t-butyl group, or the like. Additionally, the cycloalkyl group is preferably cyclohexyl group or the like, and the aryl group is preferably phenyl group or the like.

In the case the aforementioned compound represented by the general formula (5) has plural the siloxane bond-formable group X's, they may be same or different.

A compound represented by the aforementioned formula (5) is as follows.

In the case of m=0, examples of the compound include tetramethoxysilane, tetraethoxysilane and the like.

In the case of m=1, examples of the compound include trimethoxysilane, triethoxysilane, tripropoxysilane, triisopropoxysilane, methyl trimethoxysilane, methyl triethoxysilane, methyl tripropoxysilane, methyl triisopropoxysilane, ethyl trimethoxysilane, ethyl triethoxysilane, propyl triethoxysilane, butyl trimethoxysilane, cyclohexyl trimethoxysilane, cyclohexyl triethoxysilane and the like.

In the case of m=2, examples of the compound include methyl dimethoxysilane, methyl diethoxysilane, ethyl dimethoxysilane, ethyl diethoxysilane, dimethyl dimethoxysilane, dimethyl diethoxysilane, diethyl dimethoxysilane, diethyl diethoxysilane and the like.

In the case of m=3, examples of the compound include trimethyl silanol, triethyl silanol, tripropyl silanol, tributyl silanol, trimethyl methoxysilane, trimethyl ethoxysilane, triethyl methoxysilane, triethyl ethoxysilane, tripropyl methoxysilane, tripropyl ethoxysilane, trimethylsilyl acetate, trimethylsilyl benzoate, triethylsilyl acetate, triethylsilyl benzoate, benzyldimethyl methoxysilane, hexamethyldisiloxane, hexaethyldisiloxane, hexapropyldisiloxane, 1,3-dibutyl-1,1,3,3-tetramethyldisiloxane (it is an example of a compound to be dimethylbutyl silanol by hydrolysis) and the like.

The compound represented by the aforementioned general formula (5) is preferably a compound in case of m=1 in the general formula (5), such as methyltriethoxysilane.

Additionally, the aforementioned compound represented by the general formula (5) is suitable for purposes of controlling viscosity so as to easily process by decreasing concentration of an oxetanyl group in the aforementioned polyorganosiloxane to control the molecular weight of the aforementioned polyorganosiloxane, of improving storage stability, reducing crosslinking density to decrease shrinkage of the cured product, and the like.

The aforementioned silicon-containing organic compound may be used alone or in combination of two or more.

[1-3] Organic Polyol Compound

This organic polyol compound is one having at least two hydroxyl groups in the molecule.

Examples of the aforementioned organic polyol compound include a polyether-based polyol, a polyester-based polyol, an alkylene glycol and the like.

Examples of the polyether-based polyol include a polyol obtained by adding ethylene oxide to the terminate of polyethylene glycol, polypropylene glycol, polytetramethylene glycol, polypropylene oxide or the like, a polyol obtained by adding ethylene oxide, propylene oxide and the like to glycol, glycerin, pentaerythritol, sorbitol, trimethylolpropane or the like, and the like. These compounds may be used alone or in combination of two or more.

Examples of the polyester-based polyol include an adipate-based polyol, a polycaprolactone-based polyol, a polycarbonate-based polyol, a polymer-based polyol having a repeating unit, such as polyether polyester polyol and polyesteramide polyol, and the like. These compounds may be used alone or in combination of two or more.

In addition, examples of the alkylene glycol include ethylene glycol, propylene glycol, 1,3-butanediol, dipropylene glycol, 1,4- or 1,5-hexanediol, glycerin, pentaerythritol, sorbitol, trimethylolpropane, cyclohexanediol, cyclohexanedimethanol and the like. These compounds may be used alone or in combination of two or more.

Among these, a polyether-based polyol, a polyester-based polyol and the like are preferred. And the preferable organic polyol compound is one having hydroxyl group in one molecule of 2-4.

The weight average molecular weight of the aforementioned organic polyol compound is preferably 300-3,000 depend and more preferably 300-2,000. When the weight average molecular weight is in this range, an obtained cured product is superior in toughness. It is noted that the weight average molecular weight in the specification is a polystyrene-equivalent weight average molecular weight by gel permeation chromatography (GPC).

The aforementioned polyol compound may be used alone or in combination of two or more.

The polyorganosiloxane of the present invention may be one obtained by conducting hydrolysis and condensation of one kind of the silicon-containing organic compound and one kind of the organic polyol compound, or be a condensate from one or more of the silicon-containing organic compound and one or more of the organic polyol compounds.

[1-4] Producing Method of Polyorganosiloxane

The polyorganosiloxane of the present invention can be produced by a known method so long as the method comprises hydrolysis and condensation of the aforementioned silicon-containing compound in the presence of the aforementioned organic polyol compound. For example, the polyorganosiloxane can be produced by advancing a process for hydrolysis and condensation, and a process for eliminating an organic solvent which was used in this process for hydrolysis and condensation successively. The preferable proportion of the aforementioned silicon-containing compound and the aforementioned organic polyol compound to be charged is 20-70% by mass and 80-30% by mass, respectively based on 100% by mass of the total of these.

The amount of water used in the aforementioned process for hydrolysis and condensation, is preferably 0.5-10 equivalents and more preferably 1.5-5 equivalents based on 1 equivalent of water required to perform hydrolysis of a siloxane bond-forming group in the silicon-containing organic compound completely.

In the aforementioned process for hydrolysis and condensation, the reaction system is acidic atmosphere having pH of preferably 0.5-4.5, more preferably 1-2. If pH of the reaction system is less than 0.5, most of oxetanyl groups tend to open ring and to reduce photocurability remarkably. On the other hand, if pH of the reaction system is exceeding 4.5, for example, weak acid such as pH5-6 sometimes leads to a reduced reaction rate of hydrolysis and condensation and takes long time for producing.

Further, in the aforementioned process for hydrolysis and condensation, a catalyst may be used and includes an acid catalyst such as hydrochloric acid, sulfuric acid, phosphoric acid, p-toluene sulfonic acid, benzoic acid, acetic acid, lactic acid and carbonic acid. Among these, hydrochloric acid is preferred. When the aforementioned acid catalyst is used, pH of the reaction system can be adjusted to the aforementioned preferable range.

The organic solvent to be used in the aforementioned process for hydrolysis and condensation is not particularly limited and examples include an alcohol such as methanol, ethanol and isopropanol; a ketone such as acetone and methylethylketone; tetrahydrofuran, toluene, 1,4-dioxane, hexane, ligroin and the like. These may be used alone or in combination of two or more. Among these, a ketone such as acetone and methylethylketone, tetrahydrofuran, 1,4-dioxane are preferred. When these solvent are used, the process for hydrolysis and condensation can be smoothly performed and make a reaction system uniform easily.

The reaction temperature during the aforementioned process for hydrolysis and condensation is preferably 10-120° C. and more preferably 20-80° C. Moreover, the reaction time is 2-30 hours and more preferably 4-24 hours.

In the case water which was not consumed in hydrolysis remains after the aforementioned process for hydrolysis and condensation, the water and the organic solvent used in the process for hydrolysis condensation reaction is eliminated, however, an ordinary distillation operation may be conducted under normal pressure or under reduced pressure.

With regard to a polyorganosiloxane obtained by the aforementioned producing method, 90% or more of the hydrolyzable group contained in the silicon-containing organic compound is preferably condensed and it is more preferably that essentially all of the hydrolyzable groups are condensed. If the proportion of the remained hydrolysable group is exceeding 10%, a formation of a silsesquioxane structure is not sufficient, thereby storage stability of the composition may be deteriorated and hardness of the cured product may be reduced. It is noted that "essentially all of the hydrolyzable groups are condensed" can be confirmed by the way that peaks based on the hydrolysable group in the NMR spectrum for the obtained polyorganosiloxane, for example, are not observed.

The polyorganosiloxane of the present invention comprises a silsesquioxane structure having a ladder-form, a cage-form or a random-form. These silsesquioxane structures may be contained in one type. And two or more silsesquioxane structures having different structure or molecular weight may be contained. When a polyorganosiloxane is produced using plural silicon-containing organic compounds, there are cases that a polyorganosiloxane where different types of compounds are condensed alternately is obtained, that a polyorganosiloxane whose composition is block form is obtained, and the like.

In addition, the polyorganosiloxane having an oxetanyl group of the present invention comprises a (Si—O—C) bond that was formed by hydrolysis and condensation of an organic polyol compound and a silicon-containing organic compound at least, in the skeleton. Moreover, it sometimes comprises a three-dimensional (Si—O—Si) bond that was formed by hydrolysis and condensation of hydrolysable groups in the silicon-containing organic compound in the skeleton.

In the polyorganosiloxane of the present invention, a (Si—O—C) bond is formed in an amount of preferably 1% or more and more preferably 10% or more based on the hydroxyl group in the organic polyol compound by hydrolysis and condensation of the organic polyol compound and the silicon-containing organic compound. If the proportion of the (Si—O—C) bond is small, a phase separation of the polyorganosiloxane and a white turbidness may be occurred.

The polyorganosiloxane having an oxetanyl group of the present invention has the weight average molecular weight of preferably 2,000-100,000 and more preferably 5,000-20,000. If the weight average molecular weight is less than 2,000, sufficient hardness of a cured film formed from this composition may not be obtained. On the other hand, if the weight average molecular weight is exceeding 100,000, the viscosity of the composition becomes too high to process hardly and coating characteristics declines in the case of using this composition as a sealing material.

[2] Curable Composition

The curable composition of the present invention contains the aforementioned polyorganosiloxane, a cationic polymerizable monomer and a cationic polymerization initiator.

[2-1] Cationic Polymerizable Monomer

This cationic polymerizable monomer is not particularly limited so long as a cation polymerization using this monomer can be conducted, however, a compound having at least one oxetanyl group in its molecular structure (hereinafter, also referred to "oxetanic monomer"), a compound having at least one epoxy group in its molecular structure (hereinafter, also referred to "epoxy-based monomer") and the like are preferable in the present invention. These may be used alone or in combination of two or more.

The aforementioned oxetanic monomer is not particularly limited so long as curing can be conducted with a cationic polymerization initiator described below, and known compounds may be used. Additionally, molecular structure, molecular weight and the like of the oxetanic monomer are not also particularly limited. It is noted that an oxetanic monomer having an aromatic ring is not preferable since it makes ultraviolet-ray transparency against the cured product low.

Specific examples of the aforementioned oxetanic monomer include 3-ethyl-3-hydroxymethyloxetane, 3-allyloxymethyl-3-ethyloxetane, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyldiethylene glycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenylethyl(3-ethyl-3-oxetanylmethyl)ether, tetrahydrofurfuryl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, bornyl(3-ethyl-3-oxetanylmethyl)ether, bis[(3-methyl-3-oxetanylmethoxy)methyl]ether, 3,7-bis(3-oxetanyl)-5-oxa-nonan, ethylene glycol bis(3-ethyl-3-oxetanylmethyl)ether, butanediol bis(3-ethyl-3-oxetanylmethyl)ether, hexanediol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, polyethylene glycol bis(3-ethyl-3-oxetanylmethyl)ether, ethylene oxide-modified hydrogenated bisphenol-A bis(3-ethyl-3-oxetanylmethyl) ether, propylene oxide-modified hydrogenated bisphenol-A bis(3-ethyl-3-oxetanylmethyl)ether, trimethylolpropane tris (3-ethyl-3-oxetanylmethyl)ether, pentaerythritol tris(3-ethyl-3-oxetanylmethyl)ether, pentaerythritol tetrakis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, ditrimethylolpropane tetrakis(3-ethyl-3-oxetanylmethyl) ether, carbonate bisoxetane, adipate bisoxetane, terephthalate bisoxetane, cyclohexanedicarboxylic acid bisoxetane, 3-(3-methyl-3-oxetanemethoxy)propyl triethoxysilane, 3-(3-ethyl-3-oxetanemethoxy)propyl trimethoxysilane and the like. These may be used alone or in combination of two or more.

The aforementioned epoxy-based monomer is not particularly limited so long as curing can be conducted with a cationic polymerization initiator described below, and known compounds may be used. Additionally, molecular structure, molecular weight and the like of the epoxy-based monomer are not also particularly limited. It is noted that an epoxy-based monomer having an aromatic ring is not preferable since it makes ultraviolet-ray transparency against the cured product low.

Specific examples of the aforementioned epoxy-based monomer include hydrogenated bisphenol-A glycidyl ether, 3,4-epoxycyclohexylmethyl-3,4-epoxycyclohexyl carboxylate, caprolactone -modified 3,4-epoxycyclohexylmethyl-3, 4-epoxycyclohexyl carboxylate, 2-(3,4-epoxycyclohexyl-5, 5-spiro-3,4-epoxy)cyclohexane-metadioxane, bis(3,4-epoxycyclohexylmethyl)adipate, 4-vinyl epoxycyclohexane, bis(3,4-epoxy-6-methylcyclohexylmethyl)adipate, 3,4-epoxy-6-methylcyclohexyl carboxylate, methylene bis(3,4-epoxycyclohexane), dicyclopentadiene diepoxide, ethylene glycol di(3,4-epoxycyclohexylmethyl)ether, ethylene bis(3, 4-epoxycyclohexane carboxylate), epoxy hexahydro dioctyl phthalate, epoxy hexahydro di-2-ethylhexyl phtalate, 1,4-butanediol diglycidyl ether, 1,6-hexanediol diglycidyl ether, triglycidyl ether of glycerin, triglycidyl ether of trimethylolpropane, tetraglycidyl ether of sorbitol, hexaglycidyl ether of dipentaerythritol, diglycidyl ether of polyethylene glycol, diglycidyl ether of polypropylene glycol, poly glycidyl ether of polyether polyol, which is obtained by adding one or two or more alkylene oxides to an aliphatic polyhydric alcohol such as propylene glycol and glycerin, monoglycidyl ether of an aliphatic long chain dibasic acid and an aliphatic higher alcohol, monoglycidyl ether of phenol, cresol, butylphenol and polyether alcohol obtained by adding an alkylene oxide to these, monoglycidyl ester of a higher fatty acid, epoxidized soybean oil, epoxystearic acid octyl ester, epoxystearic acid butyl ester, epoxidized linseed oil, epoxidized polybutadiene, ethylene oxide, propylene oxide, cyclohexene oxide, methyl glycidyl ether, butyl glycidyl ether, allyl glycidyl ether, diethylene glycol glycidyl tetrahydropyranyl ether, glycidyl methacrylate, glycidyl acetate, glycidyloxy trimethoxysilane, bis (glycidyloxy)dimethoxysilane, β-(3,4-epoxycyclohexyl) ethyl trimethoxysilane, β-(3,4-epoxycyclohexyl)ethyl triethoxysilane, 3-glycidoxypropyl trimethoxysilane, 3-glycidoxypropylmethyl dimethoxysilane, 3-glycidoxypropyl triethoxysilane and the like. In addition, compounds wherein part or all of hydrogen atoms in these compounds are substituted with a fluorine atom may be used. These compounds may be used alone or in combination of two or more.

[2-2] Cationic Polymerization Initiator

This cationic polymerization initiator can make the present composition heat-curable and photocurable, depending on its type.

The heat-curable cationic polymerization initiator is preferably one that is activated by heating to induce a ring-opening of ring-opening polymerizable group. The aforementioned heat-curable cationic polymerization initiator includes an onium salt, an organometallic complex and the like. These may be used alone or in combination of two or more.

Examples of the aforementioned onium salt include a quaternary ammonium salt, a phosphonium salt, a sulfonium salt and the like. For example, the commercially available such as "ADEKA OPTON CP-66" and "ADEKA OPTON CP-77" (trade name, both are manufactured by Adeka Corp.), "San-Aid SI-60L", "San-Aid SI-80L" and "San-Aid SI-100L" (trade name, all are manufactured by Sanshin Chemical Industry Co., Ltd.) and "CI series" (manufactured by Nippon Soda Co., Ltd.) can be used.

In addition, the photocurable cationic polymerization initiator is preferably one that is activated by receiving a light to induce a ring-opening of ring-opening polymerizable group. The aforementioned photocurable cationic polymerization initiator includes an onium salt, an organometallic complex and the like. These may be used alone or in combination of two or more.

Examples of the aforementioned onium salt include a diazonium salt, a sulfonium salt, an iodonium salt and the like. Moreover, examples of the aforementioned organometallic complex include a Fe-allene complex, a titanocene complex and the like. For example, the commercially available such as "OPTOMER SP-150" and "OPTOMER SP-170" (trade name, both are manufactured by Adeka Corp.), "UVE-1014" (trade name, manufactured by General Electronics Co.) and "CD-1012" (manufactured by Sartomer Company Inc.) can be used.

[2-3] Additive

The curable compositions of the present invention may be formulated with an additive such as an inorganic filler, an acid anhydride, a photosensitizer, a leveling agent, an anti-foam agent, a silane coupling agent, an antistatic agent, anti oxidant, a colorant and an organic solvent, in addition to the aforementioned essential components.

The inorganic filler is useful for adjusting a refractive index, and for imparting thixotropy property of the composition. And magnesium fluoride powder and silica powder may be used. These may be used alone or in combination of two or more.

The acid anhydride is useful for promoting a curing of the curable composition of the present invention, and includes phthalic anhydride, tetrahydro phthalic anhydride, hexahydro phthalic anhydride, methyl tetrahydro phthalic anhydride, methyl hexahydro phthalic anhydride, endo methylene tetrahydro phthalic anhydride, methyl endo methylene tetrahydro phthalic anhydride, succinic anhydride, maleic anhydride, pyromelletic dianhydride, benzophenone tetracarboxylic acid dianhydride, trimellitic anhydride and the like may be used. These may be used alone or in combination of two or more.

In addition, the organic solvent is useful for adjusting the viscosity of the composition and includes an alcohol such as ethanol, methanol, isobutanol and 3-methyl-3-methoxybutanol, a ketone such as methylethylketone, methylisobutylketone and cyclohexanone, an ether such as diethylether, isopropylether, tetrahydrofuran, dioxane, ethylene glycol dimethylether, ethylene glycol diethylether and diethylene glycol diethylether, an ester such as ethyl acetate, n-butyl acetate, 3-methoxy-3-methylbutyl acetate, ethylene glycol monomethylether acetate, ethylene glycol monoethylether acetate, ethylene glycol monobutylether acetate, diethylene glycol monomethylether acetate, diethylene glycol monoethylether acetate, propylene glycol monomethylether acetate, propylene glycol monoethylether acetate and γ-butylolactone, and an aromatic hydrocarbon such as benzene, toluene and xylene. These may be used alone or in combination of two or more.

[2-4] Preparation Process of the Composition

The curable composition of the present invention is a curable composition which contains a polyorganosiloxane having an oxetanyl group, a cationic polymerizable monomer and a cationic polymerization initiator as essential components, and may be incorporated with the aforementioned additives, ad libitum. Hereinafter, each content of components is described, however, in the case of using other additives, an organic solvent in particular, the expression "total of the composition" is replaced with the expression "total of the nonvolatile component".

The content of the polyorganosiloxane having an oxetanyl group is preferably 10-95% by mass, more preferably 15-90% by mass and further preferably 30-80% by mass based on the total of the composition. When the content is in this range, curability is excellent.

The content of the cationic polymerizable monomer is preferably 1-85% by mass, more preferably 10-80% by mass and further preferably 30-70% by mass based on the total of the composition. If the content is less than 1% by mass, only a composition leading to low curability is obtained. On the other hand, if the content is exceeding 85% by mass, only a composition having low surface hardness.

In addition, the content of the cationic polymerization initiator is preferably 0.01-5% by mass, more preferably 0.05-3% by mass and further preferably 0.1-1% by mass based on the total of the composition. In the case the content is less than 0.01% by mass, even if activation is induced by a function of heat or light, a ring-opening of ring-opening polymerizable group does not sufficiently progress in some case, thereby heat resistance and strength after polymerization may be insufficient. On the other hand, if the content is exceeding 5%, a function of proceeding a polymerization will not be improved, inversely heat resistance and strength may be reduced.

The curable composition of the present invention can be obtained by stirring the aforementioned components and the like with a publicly known blender to disperse uniformly. The specific blender includes a change-can type mixer, a planetary mixer, a disper, Henschel mixer, a kneader, an ink roll, an extruder, a three-roll mill, a sand mill and the like. Depending on types of the blender, the thermal cationic polymerization initiator is activated due to a frictional heat during mixing. Therefore, mixing is favorably conducted while cooling for holding the composition of 40° C. or less and preferably 25° C. or less.

[2-5] Curing Process of the Composition

The curing method in case of heat-curing the curable composition of the present invention includes usually heating at a temperature higher than the temperature where the cationic polymerization initiator contained in the present composition initiates a formation of a cationic species and a Lewis acid. The preferable temperature is in the range of 50-200° C. and more preferably 75-180° C.

In addition, the curing method in case of photocuring the curable composition of the present invention includes photoirradiation using a publicly known photoirradiation apparatus and the like. This photoirradiation apparatus, for example, includes a low-pressure mercury lamp, an intermediate-pressure mercury lamp, a high-pressure mercury lamp, an ultrahigh-pressure mercury lamp, a chemical lamp, a black-light lamp, a micro-wave excitation mercury lamp, a metal halide lamp and the like, that have a luminescent band at a wavelength of not more than 400 nm. The photoirradiation intensity onto a coating film which is comprised of the present composition is not particularly limited since it is selected according to its object and intended use of the invention. However, the photoirradiation intensity of the light wavelength region effective for activation of a radical photoinitiator (a light having a wavelength region ranging usually from 300-420 nm though it depends on the radical photoinitiator) is preferably in the range of 0.1-100 mW/cm$^2$. If the photoirradiation intensity onto a coating film which is comprised of the present composition is less than 0.1 mW/cm$^2$, a reaction tends to take longer. On the other hand, if the photoirradiation intensity is exceeding 100 mW/cm$^2$, a heat radiated from a photoirradiation apparatus may cause a yellowing and a deterioration of the cured product and a base material.

Moreover, the photoirradiation time to a composition is not particularly limited since it is selected according to its object and intended use of the invention. However, it is preferable to select the photoirradiation time with considering that an integrated light quantities which is represented as the product of the photoirradiation intensity and the photoirradiation time in the aforementioned light wavelength region will be in the range of 10-5,000 mj/cm$^2$. If the integrated light quantity onto a coating film which is comprised of the present composition is less than 10 mj/cm$^2$, the strength of a cured product tends to reduce since activation of the radical photoinitiator is insufficient. On the other hand, if the integrated light quantity is exceeding 5,000 mj/cm$^2$, the irradiation time needs to be very long, being inferior in productivity. In addition, when 0.1 to several minutes elapses after irradiation of an active energy ray, almost coating films are dried while proceeding a radical reaction, being capable of set-to-touch.

The curable composition of the present invention can be used as a heat-curable composition or a photocurable composition according to its object and intended use of the invention. Because of the excellent curability, the processability of the composition is excellent, too. In addition, when a cured product is formed, the transmittance of a light having a wavelength in the range of 390-770 nm can be 90% or more. Further, the cured product is also excellent in heat resistance. Moreover, the cured product never leads to a crack destruction by cyclic heat-cool in the range from −50° C. to 150° C.

Therefore, the curable composition of the present invention can be suitably used for sealing and the like without lowering properties of LED or the like.

[3] Sealing of LED or the Like

When LED or the like is sealed using the curable composition of the present invention, a publicly known molding method such as casting molding, compression molding, transfer molding (RTM), vacuum molding, centrifugal molding, injection molding and reaction injection molding (RIM) can be applied. In the case of casting molding, sealing can be completed by mounting LED on a lead frame or the like, pouring the curable composition into a mold and hardening.

EXAMPLE

Hereinafter, the present invention is concretely explained using some examples.

1. Synthesis of Polyorganosiloxane Having Oxetanyl Group

Example 1-1

100 ml of methylethylketone, 16.03 g (50 mmol) of 3-(3-methyl-3-oxetanemethoxy)propyl triethoxysilane (hereinafter, referred to "OXe -TRIES".) represented by the following formula (6), 44.58 g (250 mmol) of methyl triethoxysilane, 8.12 g (50 mmol) of hexamethyldisiloxane and 53.05 g of polyethylene glycol (product name "polyethylene glycol #400", manufactured by Wako Pure Chemical Industries Corporation, weight average molecular weight; 400) were charged into a reactor provided with a stirrer and a thermometer, and then 19.0 g of 1% hydrochloric acid ($H_2O$; 1.05 mol, HCl; 4 mmol) was gradually added slowly and stirred at 40° C. The progress of the reaction was observed by GPC. When almost OXe-TRIES were disappeared (8 hours later from starting addition of the mixture), the reaction was finished. After that, a solvent was eliminated under reduced pressure to obtain a colorless and transparent resin having viscosity of 2,500 mPa at 25° C. (hereinafter, referred to "resin A1".). The weight average molecular weight of this resin A1 by GPC was 2,400.

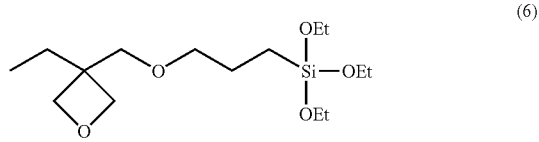

(6)

Example 1-2

100 ml of methylethylketone, 16.03 g (50 mmol) of the aforementioned OXe-TRIES, 44.58 g (250 mmol) of methyl triethoxysilane, 8.12 g (50 mmol) of hexamethyldisiloxane and 53.05 g of polytetramethylene glycol (product name "polytetramethylene glycol #1500", manufactured by Wako Pure Chemical Industries Corporation, weight average molecular weight; 1,500) were charged into a reactor provided with a stirrer and a thermometer, and then 19.0 g of 1% hydrochloric acid ($H_2O$; 1.05 mol, HCl; 4 mmol) was gradually added slowly and stirred at 40° C. The progress of the reaction was observed by GPC. When almost OXe-TRIES were disappeared (8 hours later from starting addition of the mixture), the reaction was finished. After that, a solvent was eliminated under reduced pressure to obtain a colorless and transparent resin having viscosity of 4,600 mPa at 25° C. (hereinafter, referred to "resin A2".). The weight average molecular weight of this resin A2 by GPC was 4,500.

Figure 2:
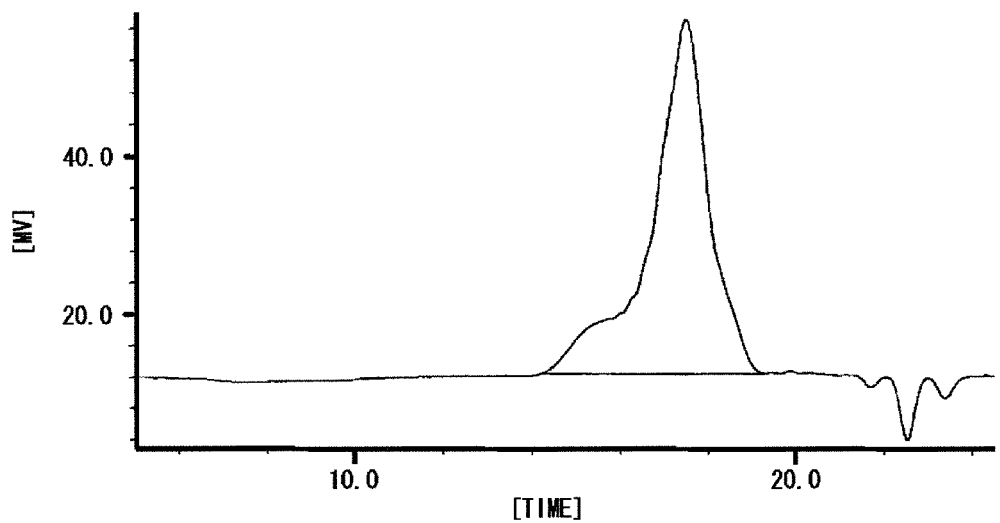
FIG. 2 is a GPC chromatogram of resin A2 obtained in Example 1-2.

Molecular weight distributions of resin A1 obtained in Example 1-1 and resin A2 obtained in Example 1-2 were evaluated by GPC, chromatograms shown in FIG. 1 and FIG. 2 were provided. It is found that a polyorganosiloxane was formed by hydrolysis and condensation of a silicon-containing organic compound (I), a silicon-containing organic compound (II) and an organic polyol compound since each of these figures had one peak with showing no peaks derived from starting components.

Comparative Example 1-1

100 ml of isopropyl alcohol, 16.03 g (50 mmol) of the aforementioned OXe-TRIES, 44.58 g (250 mmol) of methyl triethoxysilane and 8.12 g (50 mmol) of hexamethyldisiloxane were charged into a reactor provided with a stirrer and a thermometer, and then 19.0 g of 1% hydrochloric acid ($H_2O$; 1.05 mol, HCl; 4 mmol) was gradually added slowly and stirred at 40° C. The progress of the reaction was observed by GPC. When almost OXe-TRIES were disappeared (8 hours later from starting addition of the mixture), the reaction was finished. After that, a solvent was eliminated under reduced pressure to obtain a colorless and transparent resin having viscosity of 9,700 mPa at 25° C. (hereinafter, referred to "resin A3".).

2. Preparation of Curable Composition and Evaluation of Cured Product 2-1. Preparation and Evaluation of Heat-Curable Composition

Example 2-1

60 parts by mass of the "resin A1" obtained in the aforementioned Example 1-1, 40 parts by mass of caprolactone-modified 3,4-epoxycyclohexylmethyl-3,4-epoxycyclohexyl carboxylate represented by the following formula (7) as a cationic polymerizable monomer and 0.2 part by mass of a thermal polymerization initiator (product name "ADEKA OPTON CP-66" manufactured by Adeka Corp.) were mixed using a disper for 15 minutes. After that, defoaming was performed to a heat -curable composition.

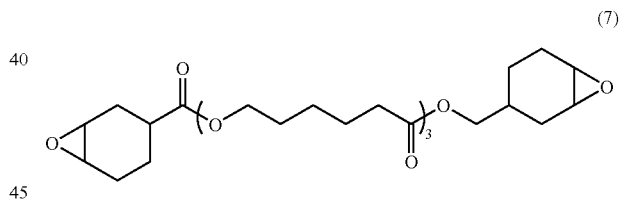

(7)

A cured product was obtained using the aforementioned heat -curable composition, and various evaluations were conducted by the following method. The results are shown in Table 1.

(1) Transmittance of Ultraviolet-Ray

A heat-curable composition was poured to a molding which is made of a fluorine resin and whose size is 50 mm×50 mm×3 mm depth and was heated at 150° C. for one hour to obtain a cured product. This cured product was set for 24 hours in a temperature-controlled room whose temperature is 25° C. and humidity is 60%, and then the transmittance of ultraviolet-ray at a wavelength of 400 nm for the cured product having thickness of 3 mm was measured with a spectrophotometer "UV-3100" manufactured by Shimadzu Corporation.

(2) Cyclic Heat-Cool Property

For observing occurrence of cracks, five cured products that were produced in the aforementioned (1) were prepared and a test of repeating 300 times of a heating from −50° C. to 150° C. (heating time; 30 minutes) and a cooling from 150° C.

to −50° C. (cooling time; 10 minutes) was conducted. In Table 1, "○" means no occurrence of cracks and "X" means that 3 or more cured products had cracks occurred.

(3) Heat Resistance

A heat-curable composition was poured to a molding which is made of a fluorine resin and whose size is 5 mm×5 mm×1 mm depth and was heated at 150° C. for one hour to obtain a cured product. This cured product was set for 24 hours in a temperature-controlled room whose temperature is 25° C. and humidity is 60%, and then a temperature where 5%-weight loss occurred was measured under the following condition with a thermogravimetric analysis apparatus "TG/DTA 220" manufactured by Seiko Instruments Inc.

Temperature range measured; from room temperature to 500° C.

Increasing temperature rate; 10° C./min.

Atmosphere; air.

(4) Shore Hardness D

It was measured according to JIS K7215.

Examples 2-2 and 2-3

Heat-curable compositions were prepared in the same manner as in Example 2-1 except that components described in Table 1 were used or their amounts to be charged were changed, and a variety of evaluations were performed. The results were jointly in Table 1.

Comparative Example 2-1

A heat-curable composition was prepared in the same manner as in Example 2-1 except that components described in Table 1 were used, and a variety of evaluations were performed. The results were jointly in Table 1.

2-2. Preparation and Evaluation of Photocurable Composition

Example 2-4

60 parts by mass of the "resin A1" obtained in the aforementioned example, 40 parts by mass of the aforementioned cationic polymerizable monomer and 0.2 part by mass of bis(dodecylphenyl)iodonium hexafluoroantimonate as a photopolymerization initiator were mixed using a disper for 15 minutes. After that, defoaming was performed to a photocurable composition.

A cured product was obtained using the aforementioned photocurable composition and was set for 24 hours in a temperature-controlled room whose temperature is 25° C. and humidity is 60%. After that, the aforementioned various evaluations were conducted. The results are shown in Table 1.

The cured product was obtained by pouring the photocurable composition into a molding which is made of a fluorine resin and whose size is 50 mm×50 mm×3 mm depth and radiating ultraviolet-ray under the following condition until tackiness on the surface was disappeared.

[Condition for Irradiation of Ultraviolet-Ray]

Lamp; 80 W/cm high pressure mercury lamp

Height of the lamp; 10 cm

Conveyer speed; 10 m/min.

Passing number irradiated; 10 times

Atmosphere; air.

As the cured product for evaluation of cyclic heat-cool property, a cured product for measuring transmittance of ultraviolet-ray was used.

A cured product for evaluation of heat resistance was obtained by pouring the photocurable composition into a molding which is made of a fluorine resin and whose size is 5 mm×5 mm×1 mm depth and radiating ultraviolet-ray under the aforementioned condition where the cured product for measuring transmittance of ultraviolet-ray was obtained.

Comparative Example 2-2

A photocurable composition was prepared in the same manner as in Example 2-4 except that components described in Table 1 were used, and a variety of evaluations were performed. The results were jointly in Table 1.

TABLE 1

|  |  |  | Example | | | | Comparative Example | |
|---|---|---|---|---|---|---|---|---|
|  |  |  | 2-1 | 2-2 | 2-3 | 2-4 | 2-1 | 2-2 |
| Composition | Polyorganosiloxane | Resin A1 | 60 | 40 |  | 60 |  |  |
|  |  | Resin A2 |  |  | 60 |  |  |  |
|  |  | Resin A3 |  |  |  |  | 60 | 60 |
|  | Cationic polymerizable monomer |  | 40 | 60 | 40 | 40 | 40 | 40 |
|  | Thermal polymerization initiator |  | 0.2 | 0.2 | 0.2 |  | 0.2 |  |
|  | Photopolymerization initiator |  |  |  |  | 0.2 |  | 0.2 |
| Evaluation | Transmittance of ultraviolet-ray (400 nm) |  | 98% | 98% | 97% | 97% | 99% | 99% |
|  | Cyclic heat-cool property |  | ○ | ○ | ○ | ○ | X | X |
|  | Temperature at occurring 5%-weight loss |  | 250° C. | 260° C. | 240° C. | 250° C. | 280° C. | 290° C. |
|  | Shore hardness D |  | 2 | 5 | 7 | 2 | 64 | 59 |

According to Table 1, it is found that transparency against a light at a wavelength of 400 nm and heat resistance of the cured products obtained in Examples were approximately the same as those of the cured products obtained in Comparative Examples, and that the Examples were remarkably excellent in cyclic heat-cool property and flexibility.

INDUSTRIAL APPLICABILITY

The curable composition of the present invention is excellent in curability and productivity is high. And it leads to a cured product excellent in ultraviolet-ray transparency and heat resistance. The cured product is one where toughness and occurrence of a crack by cyclic heat-cool are improved. Therefore, it is useful in applying a sealing material for a luminous body comprising a luminous element by ultraviolet-ray, and the like.

The invention claimed is:

1. A polyorganosiloxane having an oxetanyl group, which is obtained by conducting hydrolysis and condensation of a silicon-containing organic compound represented by the general formula (1) and an organic polyol compound having two or more hydroxyl groups

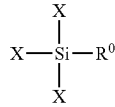  (1)

wherein X is each independently a hydrolysable group, and $R^0$ is an organic functional group having an oxetanyl group wherein said polyorganosiloxane comprises in the skeleton, at least a (Si—O—C) bond that was formed by hydrolysis and condensation of said silicon-containing organic compound and said organic polyol compound.

2. The polyorganosiloxane according to claim 1, wherein $R^0$ in the general formula (1) is an organic functional group represented by the general formula (2) below

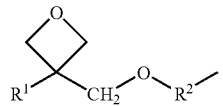  (2)

wherein $R^1$ is a hydrogen atom or a $C_{1-6}$ alkyl group, and $R^2$ is a $C_{2-6}$ alkylene group.

3. The polyorganosiloxane according to claim 1, which is obtained by conducting hydrolysis and condensation of said silicon-containing organic compound, said organic polyol compound, and one compound selected from the group consisting of a silicon-containing organic compound represented by the general formula (3)-(5);

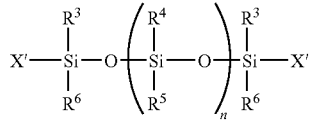  (3)

wherein X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$ and $R^5$ is a substituent selected from the group consisting of an alkyl group, a cycloalkyl group and an aryl group, and n is an integer of 1-10,000;

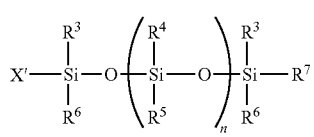  (4)

wherein X' is a siloxane bond-formable group, each of $R^3$ and $R^6$ is a substituent selected from the group consist-
ing of an alkoxy group, a cycloalkoxy group, an aryloxy group, an alkyl group, a cycloalkyl group and an aryl group, each of $R^4$, $R^5$ and $R^7$ is a substituent selected from the group consisting of an alkyl group, a cycloalkyl group and an aryl group, and n is an integer of 1-10,000;

$$R^8{}_m SiX''{}_{4-m}$$  (5)

wherein X'' is a siloxane bond-formable group, $R^8$ is a substituent selected from the group consisting of an alkyl group, a cycloalkyl group and an aryl group, and m is an integer of 0-3.

4. The polyorganosiloxane according to claim 2, which is obtained by conducting hydrolysis and condensation of said silicon-containing organic compound, said organic polyol compound, and one compound selected from the group consisting of a silicon-containing organic compound represented by the general formula (3)-(5);

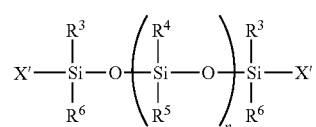  (3)

wherein X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$ and $R^5$ is a substituent selected from the group consisting of an alkyl group, a cycloalkyl group and an aryl group, and n is an integer of 1-10,000;

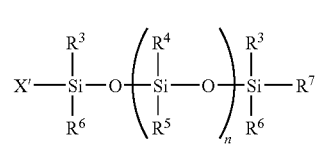  (4)

wherein X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$, $R^5$ and $R^7$ is a substituent selected from the group consisting of an alkyl group, a cycloalkyl group and an aryl group, and n is an integer of 1-10,000;

$$R^8{}_m SiX''{}_{4-m}$$  (5)

wherein X'' is a siloxane bond-formable group, $R^8$ is a substituent selected from the group consisting of an alkyl group, a cycloalkyl group and an aryl group, and m is an integer of 0-3.

5. The polyorganosiloxane according to claim 1, wherein $R^0$ is an organic functional group whose number of carbon atoms is 20 or less.

6. The polyorganosiloxane according to claim 1, wherein said organic polyol compound has a weight average molecular weight of 300-3,000.

7. The polyorganosiloxane according to claim 1, wherein said organic polyol compound has 2-4 hydroxyl groups per molecule.

8. The polyorganosiloxane according to claim 1, wherein said silicon-containing compound and said organic polyol compound are reacted in amounts of 20-70% by mass and 30-80% by mass respectively based on 100% by mass total.

9. The polyorganosiloxane according to claim 1, wherein said polyorganosiloxane comprises a silsesquioxane structure.

10. The polyorganosiloxane according to claim 1, wherein said polyorganosiloxane has a weight average molecular weight of 2,000 to 100,000.

11. A method for producing the polyorganosiloxane having an oxetanyl group of claim 1 comprising the steps of:
conducting hydrolysis and condensation of a silicon-containing organic compound represented by the general formula (1) and an organic polyol compound having two or more hydroxyl groups in an organic solvent;

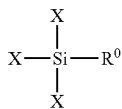
(1)

wherein X is each independently a hydrolysable group, and $R^0$ is an organic functional group having an oxetanyl group.

12. The method for producing polyorganosiloxane according to claim 11, wherein said organic solvent is at least one selected from the group consisting of a ketone, tetrahydrofuran, toluene, 1,4-dioxane, hexane and ligroin.

13. A polyorganosiloxane having an oxetanyl group, which is obtained by conducting hydrolysis and condensation of a silicon-containing organic compound represented by the general formula (1) and an organic polyol compound having two or more hydroxyl groups

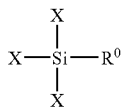
(1)

wherein X is each independently a hydrolysable group, and $R^0$ is an organic functional group having an oxetanyl group wherein said organic polyol is selected from the group consisting of a polyether-based polyol, a polyester-based polyol, and an alkylene glycol.

14. A curable composition comprising the polyorganosiloxane having an oxetanyl group of claim 1, a cationic polymerizable monomer, and a cationic polymerization initiator;
wherein said polyorganosiloxane is obtained by conducting hydrolysis and condensation of a silicone-containing organic compound represented by the general formula (1) and an organic polyol compound having two or more hydroxyl groups;

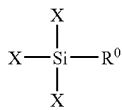
(1)

wherein X is each independently a hydrolysable group, and $R^0$ is an organic functional group having an oxetanyl group.

15. The curable composition according to claim 14, wherein wherein $R^0$ in the general formula (1) is an organic functional group represented by the general formula (2) below

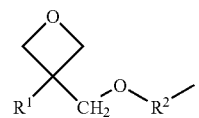
(2)

wherein $R^1$ is a hydrogen atom or a $C_{1-6}$ alkyl group, and $R^2$ is a $C_{2-6}$ alkylene group.

16. The curable composition according to claim 14, wherein said polyorganosiloxane is obtained by conducting hydrolysis and condensation of said silicon-containing organic compound, said organic polyol compound, and one compound selected from the group consisting of a silicon-containing organic compound represented by the general formula (3)-(5);

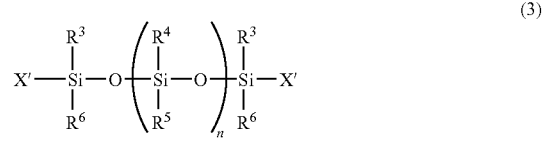
(3)

wherein X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$ and $R^5$ is a substituent selected from the group consisting of an alkyl group, a cycloalkyl group and an aryl group, and n is an integer of 1-10,000;

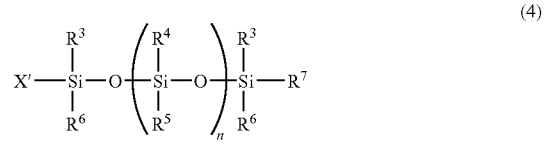
(4)

wherein X' is a siloxane bond-formable group, each of $R^3$ and $R^6$ is a substituent selected from the group consisting of an alkoxy group, a cycloalkoxy group, an aryloxy group, an alkyl group, a cycloalkyl group and an aryl group, each of $R^4$, $R^5$ and $R^7$ is a substituent selected from the group consisting of an alkyl group, a cycloalkyl group and an aryl group, and n is an integer of 1-10,000;

$$R^8{}_m SiX''_{4-m}$$ (5)

wherein X'' is a siloxane bond-formable group, $R^8$ is a substituent selected from the group consisting of an alkyl group, a cycloalkyl group and an aryl group, and m is an integer of 0-3.

17. The curable composition according to claim 14, wherein said cationic polymerizable monomer is at least one monomer selected from the group consisting of oxetanic monomer and epoxy-based monomer.

18. The curable composition according to claim 14, wherein said cationic polymerization initiator is at least one type selected from the group consisting of an onium salt and an organometallic complex.

* * * * *